United States Patent Office 2,740,658
Patented Apr. 3, 1956

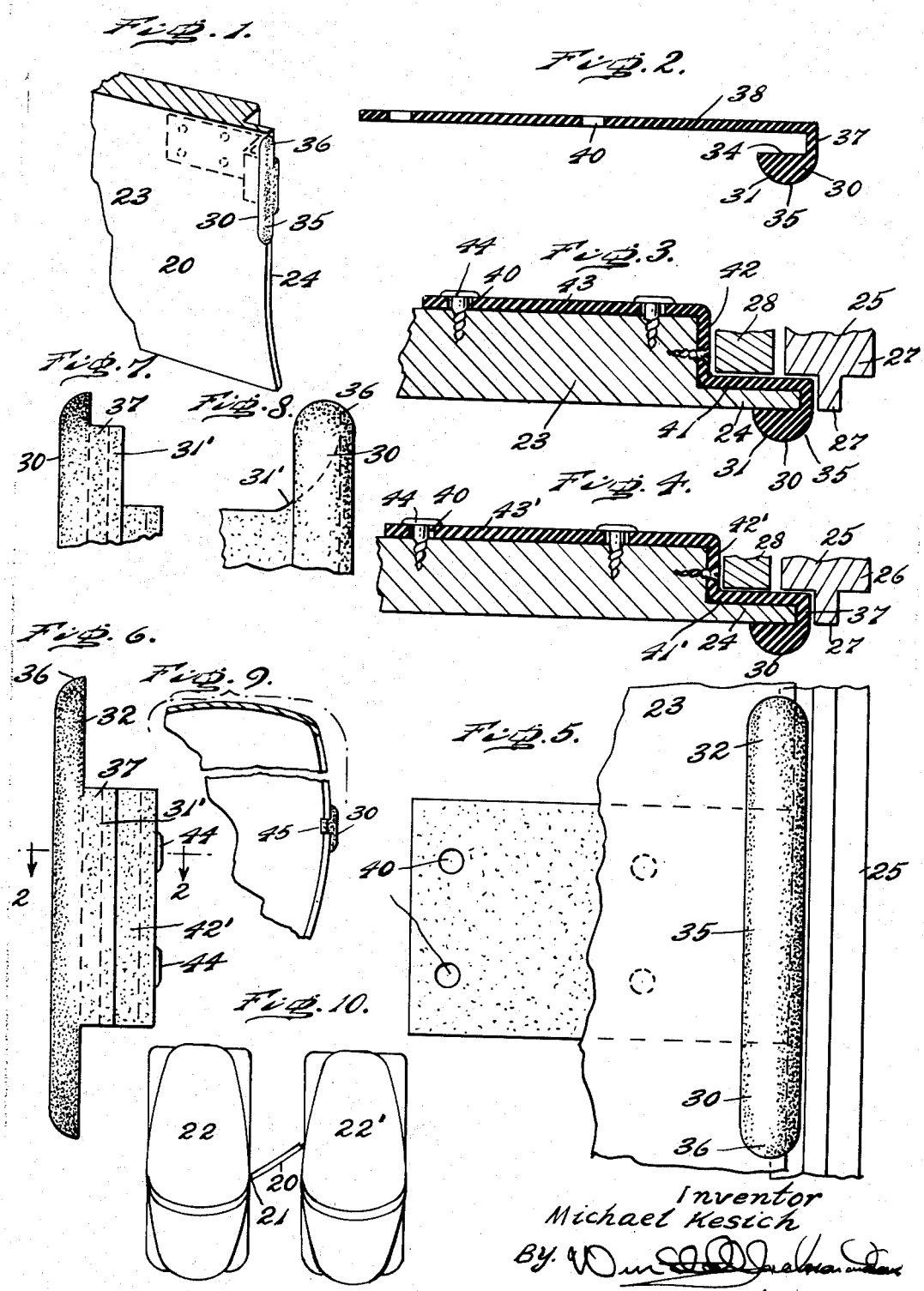

2,740,658

VEHICLE DOOR EDGE PROTECTING GUARD

Michael Kesich, Woodbury, N. J., assignor to Ruth P. Kesich

Application March 31, 1953, Serial No. 345,855

1 Claim. (Cl. 296—44)

The present invention relates to elastomer guards for automobile doors of the type which protect the door against damage when it touches against an adjoining car.

A purpose of the invention is to simplify and cheapen the mounting of guards on automobile doors.

A further purpose is to secure a guard at the outside of the edge of an automobile door and suitably at the most protruding portion of the door by an attachment which extends through the space between the door and the jamb and is secured on the inside of the door.

A further purpose is to obtain some buffer action in opening the door by the use of the guard.

A further purpose is to provide a bulbous rib extending vertically along the outside edge of the door, with a transverse sheet extending inwardly in the space between the door and the jamb and then a mounting plate integral with the sheet and the rib which extends along the interior of the door through the area in which the door flange overhangs part of the jamb and then along the inside of the door where the mounting plate can be fastened to the door.

A further purpose is to provide an automobile door guard which can be mounted on a wide variety of door constructions.

Further purposes appear in the specification and in the claim.

In the drawings I have chosen to illustrate a few only of the numerous embodiments in which my invention may appear, selecting the forms shown from the standpoint of convenience in illustration, satisfactory operation and clear demonstration of the principles involved.

Figure 1 is a fragmentary sectional perspective of an automobile door showing the guard mounted thereon.

Figure 2 is a section of the guard in the position which it assumes before mounting on the door, the section being taken on the line 2—2 of Figure 6.

Figures 3 and 4 are sections corresponding to Figure 2 of different constructions of doors and jambs with the guard mounted thereon and showing its adaptability to different constructions.

Figure 5 is a fragmentary side elevation showing the guard positioned at an automobile door.

Figure 6 is an end elevation of the guard of the invention.

Figure 7 is a fragmentary view corresponding to Figure 6 showing a modification.

Figure 8 is a fragmentary view corresponding to Figure 5 omitting the door and showing the same modification as in Figure 7.

Figure 9 is a fragmentary transverse sectional view of an automobile door showing my improved door guard.

Figure 10 is a top plan view showing two automobiles, and illustrating the use of the invention.

In the drawings like numerals refer to like parts throughout.

Describing in illustration but not in limitation and referring to the drawings:

In the prior art considerable damage has occurred to automobile doors particularly near the most protruding parts of the edges from striking against adjoining cars and the sides of garages and other obstructions when the doors are opened. In many prior art constructions the door is entirely unprotected by any bumper or similar construction, and is subject to damage when it strikes against adjoining obstacles.

Efforts have been made to provide bumpers or the like on doors, but they have met with limited success due to the fact that the constructions required special designs for each different door, and modifications were often difficult and expensive to make.

The present invention provides a guard for the most protruding portion of the door, that is, the portion of the edge of the door which is farthest from the center line of the car when the door opens. The construction is adaptable so that it can be fitted on a wide variety of door designs without changing the guard itself.

The design furthermore provides effective protection for the outside edge of the door which is opening and also for the other car or other object against which the door opens.

The support is accomplished by an engagement over a reverse bend on the flange of the door and the mounting is entirely from the inside.

Furthermore the guard in extending through the space between the door and the jamb gives additional bumper action, but does not prevent the door from closing.

In the construction shown, I illustrate an automobile door 20 hinged at 21 at a remote side to the body of an automobile 22. The door has at the side remote from the hinge a relatively thick door body 23 and a flange 24 extending in prolongation of the body and fitting into and overlapping part of the jamb 25. In the construction shown the jamb consists of a vertical support 26 having a T-shaped cross section with a rib 27 extending outwardly and cooperating with the flange 24. A sealing strip or resilient liner 28 extends along the inside of the jamb normally engaging the inside of the flange 24.

At the portion of the door which protrudes most when the door is open and therefore which will first engage the body of an adjoining car, I provide a bumper 30 in accordance with the invention. The bumper is preferably of soft rubber or other elastomer suitably of a durometer between 20 and 50. The guard desirably comprises a vertically extending rib 31 which covers the extent of the outside edge of the door remote from the hinge at the most protruding portion. The rib support 31' may be short as at 32 in Figures 5 and 6 or may be longer as at 33 in Figure 7. In cross section the rib suitably has a flat face 34 at the inside adapted to engage against the outside of the flange of the door, and is half round in cross section at 35 over the outstanding or bulbous portion which is to act as a bumper. The ends of the rib are suitably curved at 36.

The rib thus when in position on the door hugs the outer edge and is in position to protect.

The mounting portion of the guard is desirably integral with the rib 31. It suitably consists of a strip 37 desirably somewhat shorter in vertical extent than the rib which extends inwardly transverse to the inside edge 34 of the rib and occupies the space between the T portion 27 of the jamb and the end of the flange 24 of the door when the door is closed. The strip 37 covers only the end of the flange. Immediately at the inside of the strip 37 the guard is provided with an elongated mounting plate 38 which is desirably initially straight, and extends parallel to the inside edge 34 of the rib and at right anles to the length of the strip 37. The mounting plate has suitable openings 40 to receive mounting fasteners.

In a door of the type of Figure 3 the mounting plate is bent to fit the inside of the flange 24 and the end of the body 23 as well as the inside of the body. Thus there is a portion 41 extending along the inside of the flange 24, between the flange and the jamb in closed position of the door, a portion 42 extending inwardly along the end of the body and a portion 43 extending longitudinally away from the edge of the door on the inside of the body and secured thereto suitably by drive screws 44 extending into the body through the holes 40.

If the proportions of the parts of the door are different as shown in Figure 4, the portion 41' may be suitably shorter than the portion 41, the portion 42' may be suitably shorter than the portion 42 while the portion 43' is correspondingly elongated.

Accordingly it will be seen that the guard is held in place by the anchorage of the mounting plate at the inside, by the friction and compliance of the rubber and the hook action by which the reverse bend holds the rib over the flange.

The structure of Figure 7 is the same as that shown in Figure 6 except that the strip 37 is further extended to provide additional reinforcement.

Thus when the car 22 is adjoining a car 22' for example in the parking lot, the door 20 can be thrown open and the guard will protect both the outer edge of the door 20 and the other car.

In some exceptional cases I have found it necessary to find the exact vertical position desired for mounting the guard.

Figure 9 shows a form in which the door is more steeply curved and it is not necessary to place the guard in the same vertical position on the car as in other installations.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

An automobile door including a door jamb having a step portion to receive the door, and a door hingedly connected along one edge to the jamb having a flange portion at its opposite edge which extends over and engages the jamb in closed position and having a body portion which penetrates into the jamb in closed position, forming a step cross section of the door, in combination with a unitary resilient elastomer guard having a flexible rib extending along the outside of the edge of the flange portion of the door and having an elastomer mounting strip fitting over the inside of the flange portion, the edge of the body portion thus conforming to the bend of the step cross section, and resiliently engaging the mating portions of the door post and door flange and step structure to hold the guard in position and then extending over the interior of the body portion and securing the elastomer strip to the interior of the door, the structure permitting the door to close normally because of the resilience of the elastomer strip where it engages the jamb between the door and the jamb.

References Cited in the file of this patent

UNITED STATES PATENTS

| 2,050,070 | Smith | Aug. 4, 1936 |
| 2,226,615 | Killen | Dec. 31, 1940 |

FOREIGN PATENTS

| 574,470 | Great Britain | Jan. 7, 1946 |